(12) United States Patent
Aller

(10) Patent No.: US 6,752,499 B2
(45) Date of Patent: Jun. 22, 2004

(54) MYOPIA PROGRESSION CONTROL USING BIFOCAL CONTACT LENSES

(76) Inventor: Thomas A. Aller, 835 Curtis St., Albany, CA (US) 94706

( * ) Notice: Subject to any disclaimer, the term of this patent is extended or adjusted under 35 U.S.C. 154(b) by 240 days.

(21) Appl. No.: 10/155,858

(22) Filed: May 23, 2002

(65) Prior Publication Data

US 2003/0058407 A1 Mar. 27, 2003

Related U.S. Application Data

(60) Provisional application No. 60/304,912, filed on Jul. 11, 2001.

(51) Int. Cl.$^7$ ................................................ A61B 3/00
(52) U.S. Cl. ........................................ 351/247; 351/161
(58) Field of Search ................................ 351/200, 201, 351/202, 205, 219, 246, 247, 100 R, 161

(56) References Cited

U.S. PATENT DOCUMENTS

| | | |
|---|---|---|
| 3,760,807 A | 9/1973 | Neefe |
| 5,695,509 A | 12/1997 | El Hage |
| 5,838,419 A | 11/1998 | Holland |
| 6,045,578 A | 4/2000 | Collins et al. |

OTHER PUBLICATIONS

Aller, Thomas, et al.; "Myopia Control with Bifocal Contact Lenses;" Poster 92; Abstract; Dec. 10, 2000; 1 page.
Aller, Thomas; "Myopia Progression With Bifocal Soft Contact Lenses—A Twin Study;" Poster—142; Abstract; Dec. 13, 2002; 1 page.
Aller, Thomas; "Myopia Progression In A Twin Pair With Bifocal Soft Contact Lenses—Second Year Results After Single Crossover;" Poster; Abstract; Dec. 05, 2003; 1 page.

Abbott, M.L. et al. (1988). "Differences in accomodation stimulus response curves of adult myopes and emmetropes," *Ophthal. Physiol. Opt.* 18:13–20.
Aller, T. and Grisham, D. (2000). "Myopia Progression Control Using Bifocal Contact Lenses," Optics & Refraction Poster, Sun. Dec. 10, 2000, Poster #92, Northern Hemisphere C–D.
Barr, J.T. (1999). "Keeping Young Eyes Less Nearsighted," *Contact Lens Spectrum*, Aug. 1999 p. 12.
Bland, M. (1995). *An Introduction to Medical Statistics* $2^{nd}$ ed., Oxford University Press: Oxford pp. 334–337.
Brownlee, G.A. and Goss, D.A. (1988). "Comparisons of commercially available devices for the measurement of fixation disparity and associated thorias," *J. Am. Optom. Assoc.* 59:451–460.

(List continued on next page.)

*Primary Examiner*—Brian L. Casler
*Assistant Examiner*—John R Sanders
(74) *Attorney, Agent, or Firm*—Townsend and Townsend and Crew LLP

(57) ABSTRACT

The present invention provides new methods and systems for treating myopia progression in myopic patients who also exhibit near point esophoria, esophoria at near, eso fixation disparity, or eso associated phoria by selectively prescribing bifocal contact lenses to such patients. Near point eso fixation disparity may include esophores, low exophores, and orthophores. One method for controlling myopia progression comprises identifying a near point esophoric myopic patient, measuring an amount of fixation disparity, and prescribing a bifocal contact lens add power prescription. The bifocal add power prescription is based on the fixation disparity measurement and a distance prescription for the patient's eye.

27 Claims, 8 Drawing Sheets

OTHER PUBLICATIONS

Chew, S.I., et al. (1988). "The pattern of myopia in young Singaporean men," *Singapore Med. J.* 29:201–211.

COMET Study Group (1997). "The Design of the Correction of Myopia Evaluation Trial," *Scientific, Case Report, Clinical Education Posters*, Poster #83 (OR–127) p. 130;

Leung, J. and Brown, B. (1997). "The Effect of Progressive Lenses on the Progression of Myopia in Chinese School Children," *Scientific, Case Report, Clinical Education Posters*, Poster #84 (OR–128) p. 130.

Curry, T.A. (1999) "Afocal Magnification Does Not Influence Chick Eye Development," *Optometry and Vision Science*,76(5):316–319.

Dave, T. and Ruston, T. (1985). "Current trends in modern orthokeratology," *Ophthal Physiol. Opt.* 18:224–233.

Dumbleton, K.A. et al. (1999). "Changes in Myopic Refractive Error with Nine Months' Extended Wear of Hydrogel Lenses with High and Low Oxygen Permeability," *Optometry and Vision Science*,76(6): 845–849.

Edwards, M.H. and Shing, F.C. (1999). "Is Refraction in Early Infancy a Predictor of Myopia at the Age of 7 to 8 Years? The Relationship between Cycloplegic Refraction at 11 Weeks and the Manifest Refraction at Age 7 to 8 Years in Chinese Children," *Optometry and Vision Science*,76(5): 272–274.

Egashira, S.M. et al. (1993). "Comparison of cyclopentolate versus tropicamide cycloplegia in children," *Optom. Vis. Sci.* 70:1019–1026.

Ficarra, A.P. et al. (1999). "The Effects of Bifocals on the Progression of Childhood Myopia," Journal of Optometric Vision Development 30:21–24.

Friedman, L.Z. (1968). "Contact lenses and primary glaucoma– A case report," *Am. J. Optom. Arch. Am. Acad. Optom.* 45:887–890.

Fulk, G.W. et al. (2000). "Results of a clinical trial of bifocals in myopic children with near–point esophoria,".

Fulton, A.B. et al. (1982). "The relationship of myopia and astigmatism in the developing eye," *Ophthalmology* 89:298–302.

Garner, L.F. et al. (1999). "Prevalence of Myopia in Sherpa and Tibetan Children in Nepal," *Optometry and Vision Science*,76(5):282–285.

Goss et al. (1999). "Relation of Nearpoint Esophoria to the Onset and Progression of Myopia in Children," *Journal of Optometric Vision Development* 30:25–32.

Goss, D.A. (1982). Attempts to reduce the rate of increase of myopia in young people– a critical literature review, *Am. J. Optom Physiol. Opt.* 59:828–841.

Goss, D.A. and Cafey, T.W. (1999). "Clinical Findings Before the Onset of Myopia in Youth: 5. Intraocular Pressure," *Optometry and Vision Science*,76(5)286–291.

Goss, D.A. and Cox V.D.(1985). "Trends in the change of clinical refractive error in myopes," J. Am. Optom. Assoc. 56:609–613.

Goss, D.A. and Grosvenor, T. (1990). "Rates of Childhood Myopia Progression with Bifocals as a Function of Nearpoint Phoria: Consistency of Three Studies," *Optometry and Vision Science*, 67(8):637–640.

Goss, D.A. and Rainey, B.B. (1998). Relation of childhood myopia progression rates to time of year. *J. Am. Optom. Assoc.* 69:262–226.

Goss, D.A. and Rainey, B.B. (1999). "Relationahip of Accomodative Response and Nearpoint Phoria in a Sample of Myopic Children," *Optometry and Vision Science*, 76(5):292–294.

Goss, D.A. and Uyesugi, E.F. (1995). "Effectiveness of bifocal control of childhood myopia progression as a function of near–point and binocular cross–cylinder," J. Opt. Vis. Dev. 26:12–17.

Goss, D.A. and Wolter, K.L. (1999). "Nearpoint phoria changes associated with the cessation of childhood myopia progression," *J. Am. Optom Assoc.* 70(12):764–768.

Grosvenor, T. and Scott, R. (1993). "Three–Year Changes in Refraction and Its Components in Youth–Onset and Early––Onset Myopia," Optometry and Vision Science, 70(8):677–683.

Grosvenor, T. et al. (1987). "Houston myopia control study: a randomized clinical trial. Part II. Final report by the patient care team," *Am. J. Optom. Physiol. Opt.* 64(7):482–498.

Gwiazda, J. et al. (1993). "Myopic children show insufficient accomodation response to blur," *Invest. Ophthalmol Vis. Sci.* 34:690–694.

Harris, M.G. et al. (1975). "Corneal curvature and refractive error changes associated with wearing hydrogel contact lenses," *Am. J. Optom. Physiol. Opt.* 52:313–319.

Hill J.F. (1975). "A comparison of refractive and keratometric changes during adaptation to flexible and non–flexible contact lenses," *J. Am. Optom. Assoc.* 46:290–294.

Hirsch, M.J. (1963). "Changes in astigmatism during the first eight years of school– and interim report from the Ojai Longitudinal Study," *Am. J. Optom. Arch. Am. Acad. Optom.* 40:127–132.

Jensen, H. (1991). "Myopia progression young school children," *Acta Opthalmol. (Copenh) Suppl.* 200, 69:1–79.

Jiang, B.–C. and White, J.M. (1999). "Effect of Acommodative Adaptation on Static and Dynamic Accommodation in Emmetropia and Late–Onset Myopia," *Optometry and Vision Science*, 76(5):295–302.

Juler, H.E. (1904). *Ophthalmic Science and Practice*, Smith, Elder & Co. London.

Khoo, C.Y. et al. (1999). "A 3–year study on the effects of RGP contact lenses on myopic children," *Singapore Med. J.* 40:230–237.

Kirschen, D.G. et al. (1999). "Comparison of Suppression, Stereoacuity, and Interocular Differences in Visual Acuity in Monovision and Acuvue Bifocal Contact Lenses," *Optometry and Vision Science*, 76(12):832–837.

Lam, C.S.Y. (1999). "A 2–Year Longitudinal Study of Myopia Progression and Optical Component Changes among Hong Kong Schoolchildren," *Optometry and Vision Science*, 76(6): 370–380.

Leung, J.T.M. and Brown, B. (1999). "Progression of Myopia in Hong Kong Chinese Schoolchildren Is Slowed by Wearing Progressive Lenses," *Optometry and Vision Science*, 76(6):346–354.

Lin, L. et al. (1996). "Changes in ocular refraction and its components among medical students– 5– year longitudinal study," *Optom. Vis. Sci.* 73:495–498.

Lin, L. L.–K. et al. (1999). "Epidemiologic Study of Ocular Refraction among Schoolchildren in Taiwan in 1995," *Optometry and Vision Science*,76(5):275–281.

Mallett, R.F.J. (1966). "The Investigation of Heterphoria at Near and a New Fixation Disparity Technique," part I and part II, The Optician 148:547–551, 149:574–581.

Mallett, R.F.J. (1996). A Fixation Disparity Test for Distance Use, *The Optician*.

McBrien, N.A. et al. (1999). "Optical Correction of Induced Axial Myopia in the Tree Shrew: Implications for Emmetropization," *Optometry and Vision Science*, 76(6):419–427.

Mutti, D.O. and Bullimore, M.A. (1999). "Myopia: An Epidemic of Possibilities?" *Optometry and Vision Science*, 76(5):257–258.

Mutti, D.O. (2001). "Can We Conquer Myopia?" *Optometric Study Center, Review of Optometry*, Apr. 15, 2001, 80–92.

Mutti, D.O. et al. (2000). "AC/A Ratio, Age, and Refractive Error in Children," IOVS, Aug. 2000, 41(9):2469–2478.

Ong, E. et al. (1999). "Effects of Spectacle Intervention on the Progression of Myopia in Children," 76(6):363–369.

Pacella, R. et al. (1999). "Role of Genetic Factors in the Etiology of Juvenile–Onset Myopia Based on a Longitudinal Study of Refractive Error," *Optometry and Vision Science*, 76(6):381–386.

Parssinen, T.O. et al. (1989). "Effects of spectacle use an accomodation on myopic progression: final results of a three–year randomized clinical trial among school children," *Br. J. Ophthalmol.* 73:547–551.

Perrigin, J. et al. (1990). "Silicon–acrylate contact lenses for myopia control: 3 year results," Optom Vis. Sci. 67:764–769.

Pruett, R.C. (1988). "Progressive myopia and intraocular pressure, what is the linkage? A literature review," *Acta. Ophthalmol. Suppl.* 185:117–129.

Robinson, B.E. (1999). "Factors Associated with the Prevalence of Myopia in 6–Year–Olds," *Optometry and Vision Science*, 76(5):266–271.

Rosenfield, M. and Abraham–Cohen, J.A. (1999). "Blur Sensitivity in Myopes," *Optometry and Vision Science*, 76(5):303–307.

Saw, S.–M. et al. (1999). "Distance, Lighting, and Parental Beliefs: Understanding Near Work in Epidemiologic Studies of Myopia," *Optometry and Vision Science*, 76(6):355–362.

Saw, S.–M. et al. (1999). "Relation between Work and Myopia in Singapore Women," *Optometry and Vision Science*, 76(6):393–396.

Schmid, K.L. et al. (1999). "Imposed Retinal Image Size Changes—Do They Provide a Cue to the Sign of Lens–Induced Defocus in Chick?" *Optometry and Vision Science*, 76(5):320–325.

Shaih, A.W. et al. (1999). "Effect of Interrupted Lens Wear on Compensation for a Minus Lens in Tree Shrews," *Optometry and Vision Science*,76(5):308–315.

Smith, E.L. et al. (1999). "Form Deprivation Myopia in Adolescent Monkeys," *Optometry and Vision Science*, 76(6):428–432.

Stone, J. (1976). "The possible influence of contact lenses on myopia," *Br. J. Physiol. Opt.* 31:89–114.

Tigges, M. (1999). "Effects of Muscarinic Cholinergic Receptor Antagonists on Postnatal Eye Growth of Rhesus Monkeys," *Optometry and Vision Science*, 76(6):397–407.

Walline, J.J. et al. (2000). "The contact lens and myopia progression (CLAMP) study early results," *Proceedings of the VIII International Conference on Myopia*, (Thorn, F., Troilo, D. Gwiazda, J. eds.) Boston, pp. 357–361.

Wallman, J. et al. (1987). "Local retinal regions control local eye growth and myopia," *Science* 237:73–77.

Westbrook, A.M. et al. (1999). "Cone Receptor Sensitivity is Altered in Form Deprivation Myopia in the Chicken," *Optometry and Vision Science*, 76(5):326–338.

Wildsoet, C. et al. (2000). "Diurnal variations in intraocular pressure (IOP) in humans: young adult myopes and emmetropes exhibit similar patterns with include a peak near waking time and a trough at approximately midnight," Am. Acad. Optom.—International Annual Meeting Proceedings, Madrid.

Wildsoet, C.F. (1987). "Active emmetropization: evidence for its existence and ramifications for clinical practice," *Ophthal. Physiol. Opt.* 17:279–290.

Wildsoet, C.F. (1988). Structural correlates of myopia In: Myopia and Near Work, Gilmartin B. & Rosenfield M. (eds.), Butterworth–Heinemann: Oxford, pp. 31–56.

Wildsoet, C.F. and Collin, M.J. (2000). "Competing defocus stimuli of opposite sign produce oppposite effects in eyes with intact and sectioned optic nerves in the chick," *Invest Ophthalmol. Vis.Sci.* (ARVO abstracts). 41:S738.

Wildsoet, C.F. and Norton, T.T. (1999). "Toward Controlling Myopia Progression?" *Optometry and Vision Science*, 76(6):341–342.

Winawer, J.A. et al. (2000). "Is myopic blur more important than sharp vision for positive– lens compensation?" *Invest Ophthalmol. Vis. Sci.* (ARVO abstracts). 41:S136.

Wu, M.M.–M. and Edwards, M.H. (1999). "The Effect of Having Myopic Parents: An Analysis of Myopia in Three Generations," *Optometry and Vision Science*, 76(6):387–392.

Zadnik, K. (1992). "The repeatability of measurement of the ocular components," *Invest. Ophthalmol. Vis. Sci.* 33:2325–2333.

Zhou, G. and Williams, R.W. (1999). "Mouse Models for the Analysis of Myopia: An Analysis of Variation in Eye Size of Adult Mice," 76(6): 408–418.

| | SV SECS<br>N    MEAN    SD | SV CONTACTS<br>N    MEAN    SD | PROG SPECS<br>N    MEAN    SD | BIFOCAL CL<br>N    MEAN    SD |
|---|---|---|---|---|
| Eyes | (92)  -0.50D   .37 | (88)  -0.51D   .33 | (20)  -0.37D   .32 | (168)  -0.08D   .27 |
| OD | (46)  -0.51D   .32 | (44)  -0.52D   .32 | (10)  -0.36D   .32 | (84)  -0.06D   .24 |
| OS | (46)  -0.50D   .42 | (44)  -0.50D   .34 | (10)  -0.38D   .33 | (84)  -0.09D   .29 |

DATA ANALYSIS (T-TEST) PROGRESSION RATES

| | SV CONTACTS | PROG SPECTACLE | BIFOCAL CONTACTS |
|---|---|---|---|
| SV SPECTACLE | P≤0.93 | P≤0.20 | P≤0.00001 |
| SV CONTACTS | | P≤0.19 | P≤0.00001 |
| PROG SPECTACLE | | | P≤0.018 |

Rates shown are for the right eye converted to axis 180.

Rates shown are for the right eye converted to axis 90.

| AGE | N | SV SPECTACLE | N | SV CONTACT | N | PROGRESSIVE SPECTACLE | N | BIFOCAL CONTACT |
|---|---|---|---|---|---|---|---|---|
| <10 | 8 | -0.58 | | | 1 | -0.63 | | |
| 10-14.99 | 17 | -0.57 | 6 | -0.58 | 9 | -0.36 | 21 | -0.15 |
| 15-19.99 | 6 | -0.32 | 12 | -0.55 | | | 21 | -0.09 |
| 20-24.99 | 9 | -0.43 | 12 | -0.46 | | | 15 | -0.06 |
| 25-29.99 | 5 | -0.60 | 12 | -0.52 | | | 14 | +0.01 |
| 30-34.99 | | | | | | | 9 | +0.08 |

FIG. 7A

DATA ANALYSIS (T-TEST) PROGRESSION RATES

| AGE | SV SPEC RATE | N | BFL CL RATE | N | P |
|---|---|---|---|---|---|
| 10-14.99 | -0.57 | 17 | -0.15 | 21 | .0006 |
| 15-19.99 | -0.32 | 6 | -0.09 | 21 | .03* |
| 20-24.99 | -0.43 | 9 | -0.06 | 15 | .007 |
| 25-29.99 | -0.60 | 5 | +0.01 | 14 | .03* |

FIG. 7B

| AGE | SV SCL RATE | N | BFL CL RATE | N | P |
|---|---|---|---|---|---|
| 10-14.99 | -0.58 | 6 | -0.15 | 21 | .0003 |
| 15-19.99 | -0.55 | 12 | -0.09 | 21 | .0002 |
| 20-24.99 | -0.46 | 12 | -0.06 | 15 | .00004 |
| 25-29.99 | -0.52 | 12 | +0.01 | 14 | .003 |

FIG. 7C

| INITIAL RX | SV SPECS N MEAN SD | SV SCL N MEAN SD | PROG MFL N MEAN SD | BIFOCAL CL N MEAN SD |
|---|---|---|---|---|
| <-1.00 | (8) -0.42 .28 | (3) -0.26 .05 | (1) -0.63 NA | |
| <-1.00 to -1.99 | (19) -0.46 .32 | (13) -0.66 .51 | (2) -0.18 .22 | (13) -0.07 .19 |
| <-2.00 to -2.99 | (11) -0.53 .27 | (7) -0.50 .25 | (3) -0.56 .47 | (17) +0.00 .32 |
| <-3.00 to -3.99 | (6) -0.82 .41 | (4) -0.49 .17 | (2) -0.22 .31 | (18) -0.10 .20 |
| <-4.00 to -4.99 | (1) -0.37 NA | (6) -0.45 .21 | (2) -0.24 .12 | (14) -0.13 .21 |
| <-5.00 to -5.99 | (1) -0.28 NA | (9) -0.50 .21 | | (7) -0.05 .35 |
| <-6.00 to -6.99 | | (1) -0.30 NA | | (8) -0.07 .17 |
| <-7.00 | | (2) -0.45 .06 | | (7) +0.01 .25 |

FIG. 8

| TREATMENT | RATE (D/YR) (<20 y.o.) | N | RATE (D/YR) (>20 y.o.) | N | P |
|---|---|---|---|---|---|
| SV SPECS | -0.52 | 31 | -0.48 | 15 | 0.69 |
| SV SCL | -0.56 | 18 | -0.50 | 25 | 0.51 |
| BIFOCAL CL | -0.12 | 42 | -0.01 | 42 | 0.03 |

FIG. 7D

MYOPIA PROGRESSION CONTROL USING BIFOCAL CONTACT LENSES

CROSS-REFERENCES TO RELATED APPLICATIONS

The present application is a non-provisional patent application and claims the benefit of priority from U.S. Provisional Application No. 60/304,912, filed Jul. 11, 2001, the full disclosure of which is incorporated herein by reference.

BACKGROUND OF THE INVENTION

1. Field of the Invention

The present invention relates generally to methods and systems for the treatment of myopia progression. In particular, the present invention relates to methods and systems for treating myopia progression in myopic patients who also exhibit near point esophoria, esophoria at near, eso fixation disparity, and/or eso associated phoria.

Myopia, also known as nearsightedness, is a visual defect in which distant objects appear blurred because their images are focused in front of the retina rather than on it causing a retinal blur. Myopia is one of the more prevalent human visual disorders, affecting up to 25% of American adults, with associated cost of correction and management having been estimated at several billion dollars per year. In some regions of the world, up to 75% of people may have myopia. Moreover, the prevalence of myopia may even be increasing. In some instances, high levels of myopia may result in grave consequences, such as, blindness from retinal detachment, myopic macular degeneration, cataract, glaucoma, or severe side effects or complications from myopia correction. Thus, treatments which control, reduce, inhibit, or even reverse myopia progression would have a widespread benefit.

It is believed that myopia may be caused by environmental factors, particularly intensive and excessive near work, with hereditary/genetic factors further defining susceptibility. Numerous animal studies have demonstrated that prolonged hyperopic defocus triggers an increase in eye growth, typically along an axial length of the eye, which can cause myopic change, as shown in FIG. 1. The dotted line in FIG. 1 denotes expansion of the eye, particularly the vitreous body by growth of the choroid and/or sclera. Prolonged hyperopic defocus may be caused by naturally occurring refractive errors. More importantly, people engaged in intense near work while in a state of inadequate accommodation (i.e. accommodation deficiencies during near work tasks) often encounter hyperopic defocus. Both accommodation deficiencies and life styles or occupations involving intensive near work result in frequent exposure to hyperopic defocus which in turn induces myopia. It has further been reported in several studies that larger than normal "accommodative lags" have been measured in progressing myopes. The term "accommodative lags" refers to hyperopic accommodative errors during intensive near work.

A number of techniques have been developed over the years to control or prevent myopia progression. These techniques include rigid contact lenses, spectacles, pharmacological delivery of atropine, biofeedback, vision training, and intentional undercorrection. Surgical correction of myopia includes refractive surgery, including myopic keratomileusis, radial keratotomy, and photorefractive keratotomy. While all these techniques have enjoyed varying levels of success, no one of these procedures is proven to provide significant myopia progression reduction or prevention in all cases.

Of particular interest to the present invention is the relationship of decreased accommodation to esophoria at near in defining the causes of progressive myopia. The term "esophoria" refers to a tendency of the eyes to turn inward. About 25% of myopic people have this eye crossing tendency. In particular, near esophoria or near point esophoria may cause decreased accommodation of the eyes during near work tasks, increasing accommodation lag. This may induce hyperopic defocus and ocular growth and thus drive myopia progression. Alternatively, decreased accommodative response may be compensated by convergence accommodation which in turn causes esophoria.

Several studies have suggested the use of bifocal spectacles or glasses to reduce the rate of myopia progression in near point esophoric children. While these proposals appear promising, they have not provided the desired evidence of myopia progression control. Moreover, the use of bifocal spectacles suffer from several inherent disadvantages that may limit their effectiveness in myopia control. For example, bifocal power is often avoided or improperly used by children (e.g. not lowering their gaze to read through the bifocal power or raise their chin to view a computer screen through the bifocal power) as well as the fact that bifocal spectacles do not provide coverage for all angles of view.

In light of the above, it would be desirable to provide improved methods and systems for the treatment of myopia progression. In particular, it would be desirable to provide improved methods and systems for controlling myopia progression in near point esophoric myope patients with a significant level of success. It would be further desirable if such treatment methods could not be avoided or used incorrectly by the patient and provide sufficient coverage for all angles of view. At least some of these objectives will be met by the invention described hereinafter.

2. Description of Background Art

Myopia progression control using bifocal contact lenses is described in a poster abstract by T. A. Aller and D. Grisham in *Optometry and Vision Science*, Vol. 77, No. 12s, Poster 92, page 182 (December 2000). Bifocal spectacle control of myopia progression in children with nearpoint esophoria is described by Goss et al. in *Optometry and Vision Science*, 67:637–640 (1990) and Goss et al. in *Journal of Optometric Vision Development*, 30:25–32 (1999). Progressive spectacles in slowing myopia is described by Leung et al. in *Optometry and Vision Science*, 76:346–54 (1999). An editorial by J. T. Barr in *Contact Lens Spectrum*, August (1999) speculates on the use of soft bifocal contact lenses for treating myopes. U.S. Pat. No. 6,045,578 describes the use of contact lenses to alter a degree of spherical aberration stop or slow myopia. U.S. Pat. No. 5,838,419 describes a method for treating myopia by altering the spectral distribution of incident light on the eye by filter or tints provided on contact lenses. U.S. Pat. Nos. 5,695,509 and 3,760,807 describe optical molds applied as hard contact lenses to reshape a surface of the cornea to reverse myopia.

The full disclosures of each of the above references are incorporated herein by reference.

BRIEF SUMMARY OF THE INVENTION

The present invention provides new methods and systems for treating myopia progression in myopic patients who also exhibit near point esophoria, esophoria at near, eso fixation disparity, and/or eso associated phoria by selectively prescribing bifocal (soft or rigid gas permeable) contact lenses to such patients. In particular, the myopigenic effects of accommodation lag during intensive near work and hyperopic defocus are addressed by treating patients who also suffer from near point esophoria. The present invention further provides a significant level of success in controlling myopia progression in esophoric myopes through the prescription of bifocal contact lenses. Bifocal contact lenses advantageously allow for effective myopia progression control as most bifocal contacts act on the principal of simultaneous vision where add powers are available independent of gaze. As such, it is less likely that a bifocal contact lens patient can avoid use of the bifocal power or otherwise use it incorrectly. Moreover, bifocal contact lenses provide sufficient coverage for all angles the eye may scan.

In a first aspect, the present invention provides methods for selectively prescribing bifocal contact lenses for controlling myopia progression. One method comprises identifying a myopic patient who exhibits near point esophoria, eso fixation disparity, or eso associated phoria, measuring an amount of fixation disparity, and prescribing a bifocal contact lens add power prescription. The bifocal near power prescription is based on the fixation disparity measurement and the bifocal distance prescription is based upon a distance prescription of the patient's eye.

Common ophthalmic measurements, such as alternating cover test, Van Graefe phoria test, Maddox rod phoria test, Titmus vision screening, vectographic fixation disparity tests, anaglyphic fixation disparity tests, telebinocular vision screening tests, computer-based tests, and like optometric tests allow for identification of near point "esophoric" patients. The term "esophoric" referring to an eye crossing tendency. Patients preferably exhibit esophoria at near as measured through their full distance correction. Most patients who are near point esophoric further have the inability to control this eye crossing tendency, thus exhibiting eso fixation disparity or eso associated phoria. Near point eso fixation disparity may include esophores, low exophores, and orthophores.

Refractive criteria, such as identification of myopia, may be based on ophthalmic measurement protocols, such as subjective history, visual acuity testing, retinoscopy, automated objective refraction, subjective refraction, cycloplegic refraction, wavefront analysis, and like optometric tests. Myopic patients may exhibit at least −0.5 D myopia in the least myopic meridian and myopia progression of at least −0.25 D in either principal meridian in either eye in the past year. It should be noted that myopia progression rates are sometimes difficult to gauge due to inconsistent measurement protocols, seasonal variations in near work activity, etc. However, it is most likely that myopic esophoric patients are progressing myopes due to observed associations between near point esophoria and myopia progression. The refractive criteria may further include identification of patients with anisometropia less than 2 D as anisometropia greater than 2 D may lead to increased risks of binocular instability and/or amblyopia. Patients with an astigmatism less than 1.5 D may further be identified. The treated patients may be pre-presbyopic, typically patients under 40 years of age, to prevent having patient that previously used reading glasses or bifocals for standard reasons relating to age. It will be appreciated, however, that the above described refractive criteria may not limit the efficacy or effectiveness of the present invention. For example, astigmatism in amounts greater than 1.5 D may affect clarity of vision with soft bifocal contact lenses, but could be well corrected for by rigid gas permeable bifocals or soft bifocal astigmatism correcting lenses. Moreover, patients with anisometropia greater than 2 D and progressing esophoric myopes over the age of 40 may still benefit from the protocols of the present invention.

Measuring fixation disparity comprises determining an amount of actual crossing of the patient's eyes. Fixation disparity measurements are typically made by viewing a displaced polarized image, such as polarized lines or arrows that are vertically or horizontally displaced, through a phoropter or trial glasses having a polarized filter, aligning the polarized image, and detecting a degree of vertical and/or horizontal misalignment of the patient's eyes based on a difference between the aligned image and true alignment. For a more detailed discourse concerning polarization techniques, reference is made to the following publications which are incorporated herein by reference: Mallett, R. F. J., A Fixation Disparity Test for Distance Use, *The Optician*, (July 1966) and Mallett, R. F. J., The Investigation of Heterphoria at Near and a New Fixation Disparity Technique, *The Optician*, (December 1966). Alternative devices and techniques used to measure fixation disparity include measuring an amount of prism or a power of an ophthalmic lens required to eliminate the fixation disparity. This is typically known as the associated phoria. Still further, alternative devices to measure fixation disparity may include the use of red or green filters instead of the Polaroid filters. The bifocal contact lens power prescription is then prescribed based on the fixation disparity measurement and a straight prescription for the patient's eye. The straight prescription is based on correcting refractive criteria, such as the amount of myopia or nearsightedness. The use of bifocal contact lenses in controlling myopia progression is particularly advantageous as the bifocal power prescription is tailored to maximally reduce the amount of near point esophoria. Specifically, the bifocal power prescription takes into account how much bifocal power is needed to correct actual eye crossing or fixation disparity.

The bifocal contact lens prescription will vary for each patient as it is ideally tailored to reduce or inhibit esophoria at near. The reduction or inhibition of esophoria at near with the bifocal contact lens power prescription may decrease accommodative lag as well as hyperopic defocus. This reduction in hyperopic defocus may result in less myopia progression. As such, the bifocal contact lens prescription may reduce accommodation lag and/or hyperopic defocus which in turn may result in reduction of myopia progression. Hence, the myopigenic effects of accommodation lag during intensive near work and hyperopic defocus may be altered by bifocal contact lenses that correct fixation disparity. Ocular growth associated with myopia progression may further be reduced with the bifocal contact lens prescription. The present methodology corrects fixation disparity with bifocal power adjustments until the patient sees straight so as to reduce myopia progression. It is further a treatment goal that the bifocal contact lens prescription preferably provide distance visual acuity of at least 20/30 in both eyes, most preferably corrected visual acuity of 20/20 in both eyes.

The present invention further provides a significant level of success in controlling myopia progression in esophoric myopes through the prescription of bifocal contact lenses. In particular, the bifocal contact lens power prescription reduces myopia progression to preferably less than −0.2 D per year, more preferably to less than −0.08 D per year. The rate of myopia progression may be reduced by 70%, preferably by 80%, most preferably by 90% with the bifocal contact lens power prescription. The bifocal contact lens power prescription may in certain circumstances inhibit or even reverse myopia progression.

The bifocal contact lens add power prescription may significantly reduce myopia progression for late onset myopes. In particular, bifocal contact lenses may reduce myopia progression for those over the age of 20 to a greater degree than for those under the age of 20. This difference based on age is consistent with the theory that late onset myopia is associated with intensive near work. Thus, the use of bifocal contact lenses that alter the stresses caused by intense near work through the correction of fixation disparity will cause more progression reduction for adults than children. However, it will be appreciated that both children and adults may benefit from the prescription of bifocal contact lenses to reduce myopia progression. The bifocal contact lens power prescription is further effective at all prescription or diopter levels of myopia.

The bifocal contact lenses preferably comprises simultaneous vision or coaxial/concentric bifocals that provide add power in all fields of gaze. The bifocal contact lens preferably comprises a soft contact lens. In certain circumstances, the bifocal contact lens may comprise a hard contact lens, a rigid gas permeable contact lens, or an intraocular or intrastromal lens. The bifocal contact lenses may further provide high oxygen permeability to prevent against any cornea swelling. Bifocal contact lenses that may be suitable for use in the present invention may be obtained from a number of bifocal contact lens manufacturers including Bausch & Lomb, Johnson & Johnson, Unilens, Ciba, Coopervision, Ultravision, Sunsoft, and the like. Preferably, Acuvue bifocal contact lenses having add powers in the range from +1.00 to +2.50 and supplied from Johnson & Johnson will be employed in the present invention. In some instances, bifocal add power may be provided by temporarily reshaping the cornea through the use of rigid lens molds or by permanently reshaping the cornea through the use of an excimer laser to create a bifocal cornea.

In another aspect of the present invention, methods for selectively prescribing bifocal contact lenses for controlling myopia progression comprise identifying a near point esophoric myopic patient, measuring an amount of fixation disparity, prescribing a bifocal contact lens add power prescription based on the fixation disparity measurement and a distance prescription for the patient's eye, and correcting fixation disparity with bifocal add power adjustments until the patient sees straight so as to reduce myopia progression.

In still another aspect of the present invention, systems for controlling myopia progression may be provided. The system may comprise a fixation disparity measurement device, such as those described above, a plurality of alternatively selectable bifocal contact lenses having differing add power prescriptions, and a correlation indicating a myopia progression inhibiting prescription from among the differing add power prescriptions of bifocal contact lenses in response to a reading of the fixation disparity measurement. The correlation may be simply calculated on pen and paper by an optometrist or ophthalmologist or may alternatively be carried out by a computer system.

A further understanding of the nature and advantages of the present invention will become apparent by reference to the remaining portions of the specification and drawings.

BRIEF DESCRIPTION OF THE DRAWINGS

FIGS. 7A–7D are results of the study showing myopia progression rates relative to age in table format.

FIG. 8 are results of the study showing myopia progression rates relative to initial prescriptions in table format.

DETAILED DESCRIPTION OF THE INVENTION

The present invention provides new methods and systems for treating myopia progression in myopic patients who also exhibit near point esophoria, esophoria at near, eso fixation disparity, or eso associated phoria by selectively prescribing bifocal contact lenses to such patients. The use of bifocal contact lenses in controlling myopia progression is particularly advantageous as the bifocal add power prescription is tailored to maximally reduce or inhibit near point eso fixation disparity.

Figure 1:
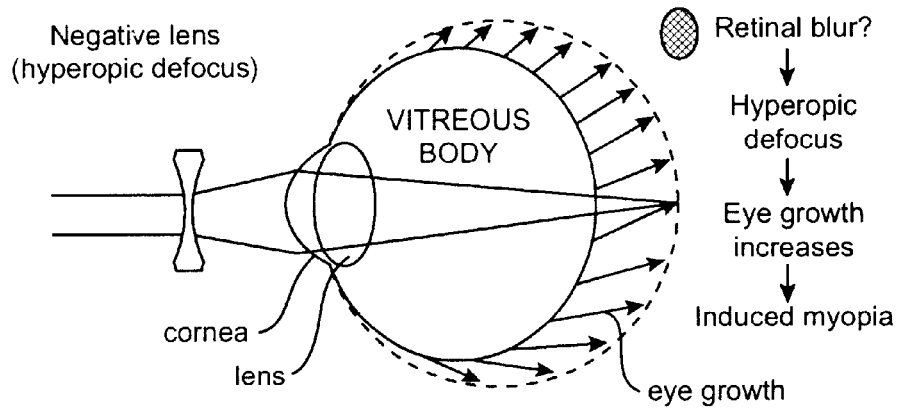
FIG. 1 illustrates the effect of hyperopic defocus on a human eye.
Figure 2:
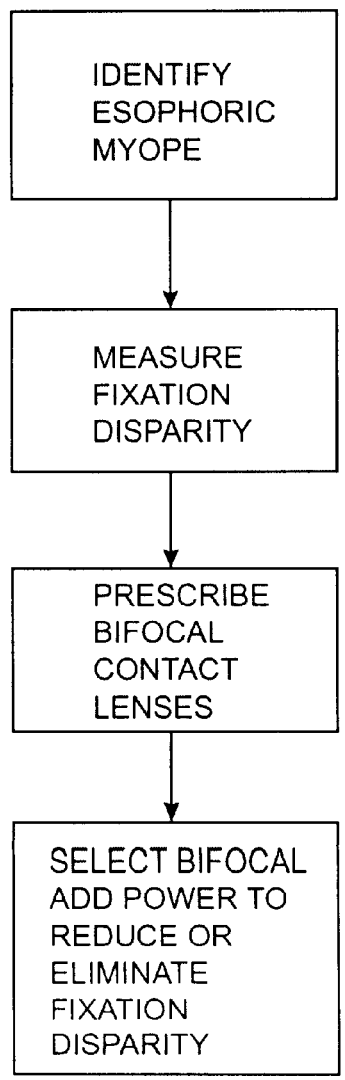
FIG. 2 is a flow chart illustrating method steps of the present invention.

Referring to FIG. 2, a flow chart illustrates the methods of the present invention for selectively prescribing bifocal contact lenses for controlling myopia progression. The method comprises identifying a myopic patient who exhibits near point esophoria, eso fixation disparity, or eso associated phoria, measuring an amount of fixation disparity, and prescribing a bifocal contact lens add power prescription. The bifocal add power prescription is based on the fixation disparity measurement and a distance prescription for the patient's eye. Fixation disparity is corrected with adjustments in bifocal add power or lens types until the patient sees straight so as to reduce myopia progression. It is a further treatment goal that the bifocal contact lens power prescription provide distance visual acuity of at least 20/30 in both eyes, most preferably visual acuity of 20/20 in both eyes. Again, adjustments in bifocal power or lens types may be made to provide acceptable levels of distance visual acuity.

Bifocal contact lenses advantageously allow for effective myopia progression control as the bifocal contact lenses preferably comprise simultaneous vision or coaxial/concentric bifocals that provide add power in all fields of gaze. As such, it is less likely that a bifocal contact lens patient can avoid use of the bifocal power or otherwise use it incorrectly. Moreover, bifocal contact lenses provide sufficient coverage for all angles the eye may scan. The bifocal contact lenses preferably comprises soft lenses. In certain circumstances, the bifocal contact lenses may comprise hard lenses, rigid gas permeable lenses, or intraocular or intrastromal lenses. The bifocal contact lenses may further provide high oxygen permeability to prevent against any cornea swelling. Bifocal contact lenses that may be suitable for use in the present invention may be obtained from a number of bifocal contact lens manufacturers as described above. Preferably, Acuvue bifocal contact lenses having add powers from +1.00 to +2.50 and supplied from Vistakon, a division of Johnson & Johnson, will be employed in the present invention.

The present invention provides a desired level of success in controlling myopia progression in esophoric myopes through the prescription of bifocal contact lenses. In particular, the bifocal contact lens power prescription reduces myopia progression to preferably less than −0.2 D per year, more preferably to less than −0.08 D per year. The rate of myopia progression may be reduced by 70%, preferably by 80%, most preferably by 90% with the bifocal contact lens power prescription. The bifocal contact lens power prescription may in certain circumstances inhibit or even reverse myopia progression. For effective myopia progression control, the prescribed bifocal contact lenses should be worn by the patient on an average daily basis for a time duration in the range from 8 hours to 24 hours, preferably from 8 hours to 16 hours.

Common ophthalmic measurements, such as alternating cover test, Van Graefe phoria test, Maddox rod phoria test, Titmus vision screening, vectographic fixation disparity tests, anaglyphic fixation disparity tests, telebinocular vision screening tests, computer-based tests, and like optometric tests allow for identification of near point esophoric patients. Patients preferably exhibit esophoria at near as measured through their full distance correction. Most patients who are near point esophoric, and some low exophoria, or orthophoria, further have the inability to control this eye crossing tendency. This inability to control the esophoric tendency is known as fixation disparity.

Identification of myopia, may be based on ophthalmic measurement protocols, such as subjective history, visual acuity testing, retinoscopy, automated objective refraction, subjective refraction, cycloplegic refraction, wavefront analysis, and like optometric tests. Myopic patients may exhibit at least −0.5 D myopia in the least myopic meridian and myopia progression of at least −0.25 D in either principal meridian in either eye in the past year. Refractive criteria may further include identification of patients with anisometropia less than 2 D as anisometropia greater than 2 D may lead to increased risks of binocular instability and/or amblyopia. Patients with an astigmatism less than 1.5 D may further be identified. The treated patients may be pre-presbyopic. Moreover, patients exhibiting low levels of hyperopia or emmetropes may be identified if they are demonstrating a progression toward myopia. It will be appreciated, however, that the above described refractive criteria may not limit the efficacy or effectiveness of the present invention.

Measuring fixation disparity comprises determining an amount of actual crossing of the patient's eyes. Fixation disparity measurements are typically made by viewing a displaced polarized image, such as polarized lines or arrows that are vertically or horizontally displaced, through a phoropter or trial glasses having a polarized filter, aligning the polarized image, and detecting a degree of vertical and/or horizontal misalignment of the patient's eyes based on a difference between the aligned image and a true alignment. Alternative devices and techniques used to measure fixation disparity include measuring an amount of prism or a power of an ophthalmic lens required to eliminate the fixation disparity. This is typically known as the associated phoria. Still further, alternative devices to measure fixation disparity may include the use of red or green filters instead of the Polaroid filters. The bifocal contact lens power prescription is then prescribed based on the fixation disparity measurement and a straight prescription for the patient's eye. The bifocal power prescription takes into account how much bifocal power is needed to correct actual eye crossing or fixation disparity so as to reduce or inhibit near point esophoria. The straight prescription is based on correcting refractive criteria, such as the amount of myopia or nearsightedness.

Figure 3:
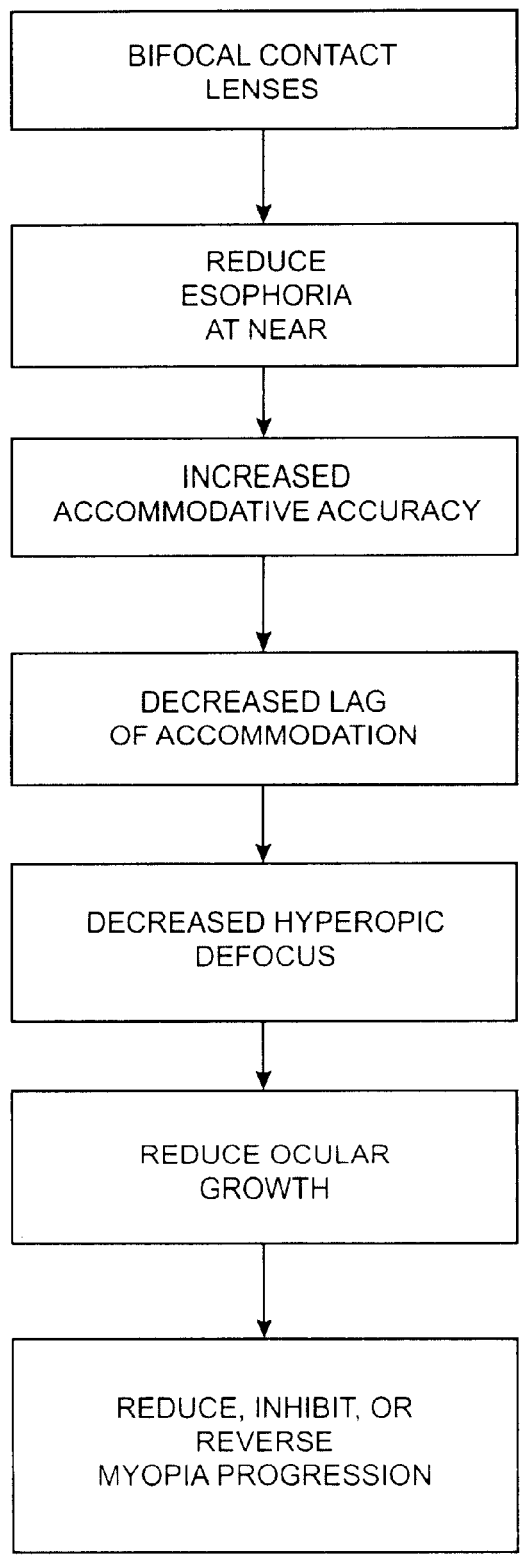
FIG. 3 is a flow chart illustrating the relationship between esophoria and myopia progression control.

Referring now to FIG. 3, the relationship between esophoria and myopia progression control is illustrated. The reduction or inhibition of esophoria at near with the bifocal contact lens add power prescription may increase accommodative accuracy which in turn reduces accommodation lag as well as hyperopic defocus. As such, the bifocal contact lens prescription may reduce accommodation lag and/or hyperopic defocus which in turn may result in reduction of myopia progression. Ocular growth associated with myopia progression may further be reduced with the bifocal contact lens prescription. Hence, the myopigenic effects of accommodation lag during intensive near work and hyperopic defocus may be altered by bifocal contact lenses that correct fixation disparity.

In the following Experimental study, four interventional treatment protocols: (1) single vision spectacle lenses (SV); (2) progressive multifocal spectacle lenses (PROG); (3) single vision soft contact lenses (SV SCL); and (4) bifocal soft contact lenses (BFL) are investigated. In particular, the results indicate the effectiveness of soft bifocal contact lenses in controlling myopia progression in pre-presbyopic esophoric myope patients.

Experimental

Purpose

This study was conducted to test the effectiveness of bifocal soft contact lenses in controlling myopic progression in pre-presbyopic esophoric subjects of all ages.

Method

This retrospective study followed 84 myopic patients, ages 9 to 40 years old, who exhibited progressive myopia and esophoria or esophoria at near. Four intervention strategies were used in a private practice setting. Rates of myopia progression were compared for single vision spectacle lenses, progressive multifocal spectacle lenses, single vision soft contact lenses, and bifocal soft contact lenses.

Patient Selection

Patients were included in this study if they met the following criteria: (1) at least −0.5 D myopia (2) astigmatism less than −1.50 D (3) near esophoria or associated esophoria at near through manifest subjective refraction through phoropter or by trial frame (4) old enough to handle contacts (>9 years) (5) pre-presbyopic (<40 years) to avoid concurrent or recent use of plus lenses (6) no contraindications to contact lenses (7) myopia progression of at least −0.25 D in either principal meridian in either eye in the past year (8) able to achieve acceptable levels of distance and near activity with bifocal contacts (9) reduction or elimination of near associated esophoria with bifocal contacts.

Comprehensive eye examinations were performed annually for all patients including, in particular: (1) history and review of reading habits (2) cover tests at distance and near through habitual correction (3) associated esophoria at near (4) auto refraction (5) monocular subjective refraction (6) binocular Polaroid balance (7) least minus binocular reduction to best corrected visual acuity (8) phorias and associated phorias at distance and near (9) keratometry and biomicroscopy.

Patients meeting the study criteria were fitted with bifocal soft contact lenses. Several lens types were used depending on availability and parameters including: (1) Bausch & Lomb Occasions Multifocal, a distance center, aspheric multifocal lens with a +1.5 D Add power (2) Acuvue Bifocal, a concentric design with a distance center, surrounded by five alternating near and distance rings with Add powers from +1.00 to +2.50 D (3) Unilens Multifocal and Unilens EMA, front aspheric, near center lenses with Adds of +1.5 D and +2.00 D (4) Sunsoft Multifocal and Additions, near center, aspheric lenses with Adds from +1.00 D to +2.25 D (5) Specialty Ultravision Bifocal, a concentric design with a +1.50 D Add. The goals for the bifocal lens fitting were: (1) achieve acceptable distance visual acuity (20/30 or better) (2) reduce or eliminate associated esophoria at near. Lens types and or powers were adjusted as needed to satisfy the two goals of acceptable distance visual acuity and significant reduction or elimination of near esophoria or associated esophoria at near. After contact lens dispensing, progress exams were scheduled. At each subsequent visit, distance visual acuities, near phorias and associated phorias were measured.

Subject wore in various combinations, SV glasses, SV SCL, progressive multifocal spectacles, prior to wearing bifocal soft contact lenses. 27 patients wore SV SCL prior to beginning bifocal SCL wear. 24 patients wore SV spectacles prior to bifocal soft contact lens wear. 17 patients began wearing SV spectacles, progressed to SV SCL wear, and then bifocal SCL wear. Four patients began progressive multifocal wear prior to beginning bifocal soft contact lens wear. Five patients started with SV spectacles, then progressive multifocals prior to BFL SCL wear. Seven patients wore only BFL SCL.

Results

Myopia was found to increase on average about −0.50 diopters per year while patients wore single vision spectacle lenses or single vision soft contact lenses. With progressive addition multifocal spectacles, the rate of progression was −0.37 diopter per year (p<0.20). However, with bifocal contact lens wear, the average rate of progression fell to −0.08 diopters per year (p<0.0001), effectively halting myopia progression. This result with bifocal contact lenses was found for all age groups and refractive error amounts.

Data Collection

Figures 4A, 4B, 4C:
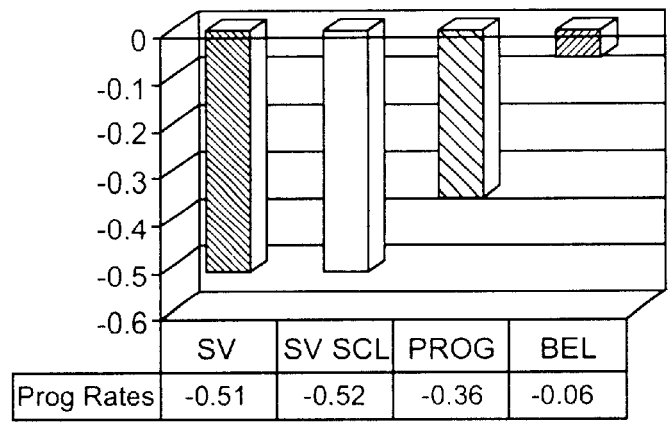
FIGS. 4A–4C are graphical results of a study (provided hereinbelow) showing myopia progression rates for patients wearing four types of corrective lenses.

FIG. 4A shows graphical results of myopia progression rates for patients wearing four types of corrective lenses. Progression rates were lowered from −0.52 D/year with single vision SCL to −0.06 D/year with bifocal SCL. The rate of progression also appeared to be lower with progressive spectacles at −0.36 D per year. FIGS. 4B and 4C present statistical analysis of the progression rates exhibited by the various treatment groups. The dramatically lower rates of myopia progression demonstrated by the bifocal soft contact lens wearers were highly significant. Progression rates were lower also with progressive multifocals as compared to single version spectacles or single vision soft contacts, but these differences were not found to be significant. The rate of myopia progression amongst the single vision spectacle wearers and the single vision soft contact lens wearers were equal at about −0.50 D/Yr.

Figure 5A:
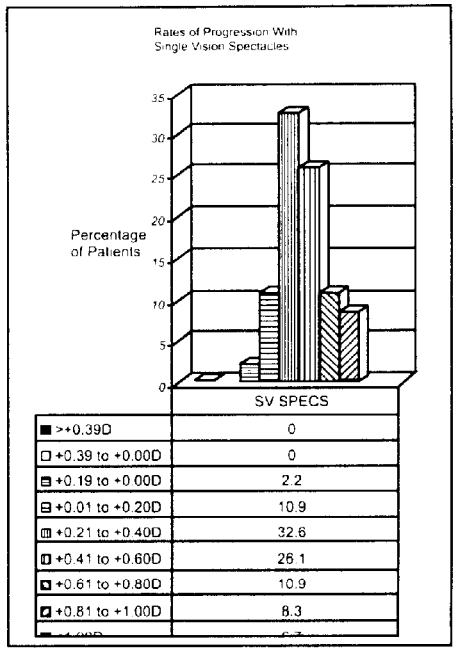
FIGS. 5A–5D are graphical results of the study showing the percentage of patients in each corrective lens group exhibiting different degrees of myopia progression.
Figure 5C:
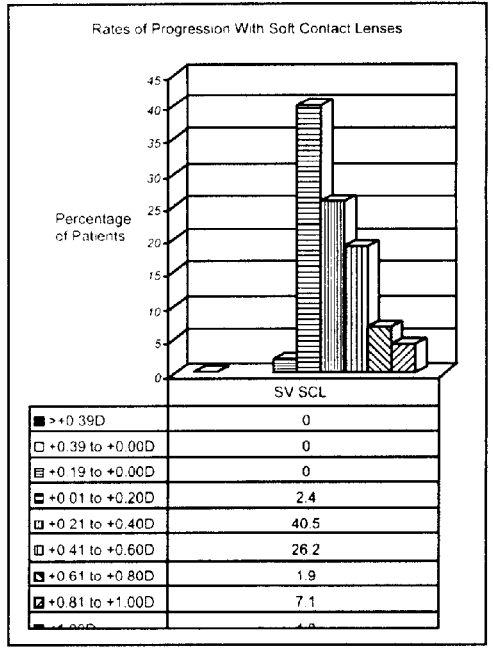
Figure 5B:
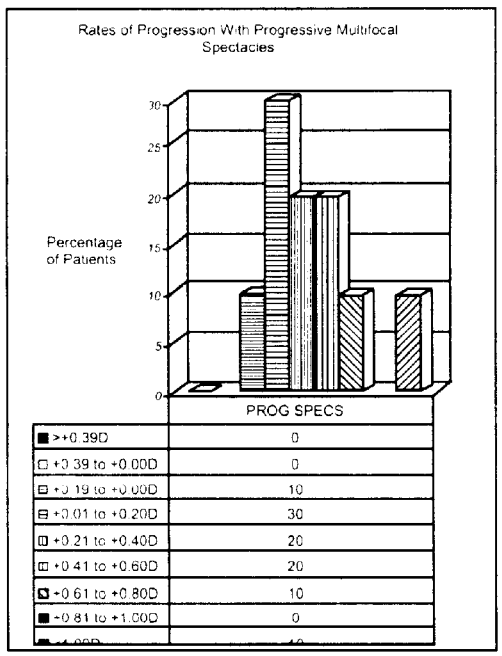
Figure 5D:
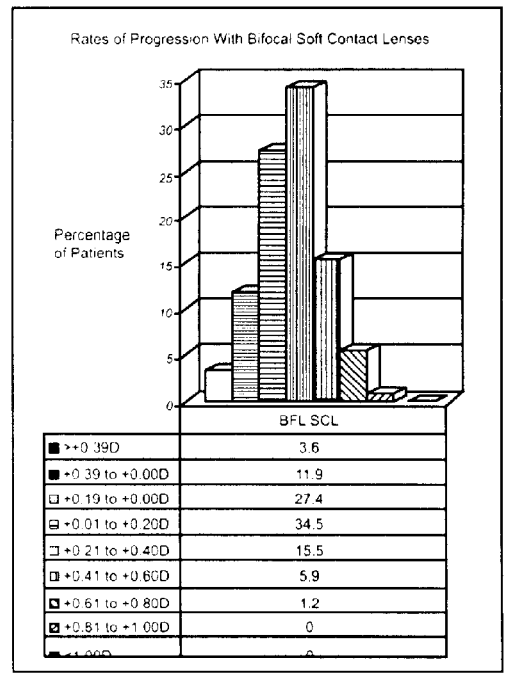

FIGS. 5A–5D are graphical results of the study showing the percentage of patients in each corrective lens group exhibiting different degrees of myopia progression. FIG. 5A shows that among 46 SV spectacle wearers, one patient (2.2%) showed zero progression during the period of time that they wore spectacles. FIG. 5B shows that among ten progressive eyeglass wearers, one patient (10%) showed zero progression. FIG. 5C shows that among 44 SV SCL wearers, no patients exhibited zero progression. FIG. 5D shows that among 84 bifocal SCL wearers, 36 patients (36%) stopped progression or reversed their myopia during bifocal wear. An even larger number of bifocal contact lens wearers, 65 out of 84 (77%) exhibited progression rates less than −0.20 D per year, arguably a clinically insignificant level.

Figure 6A:
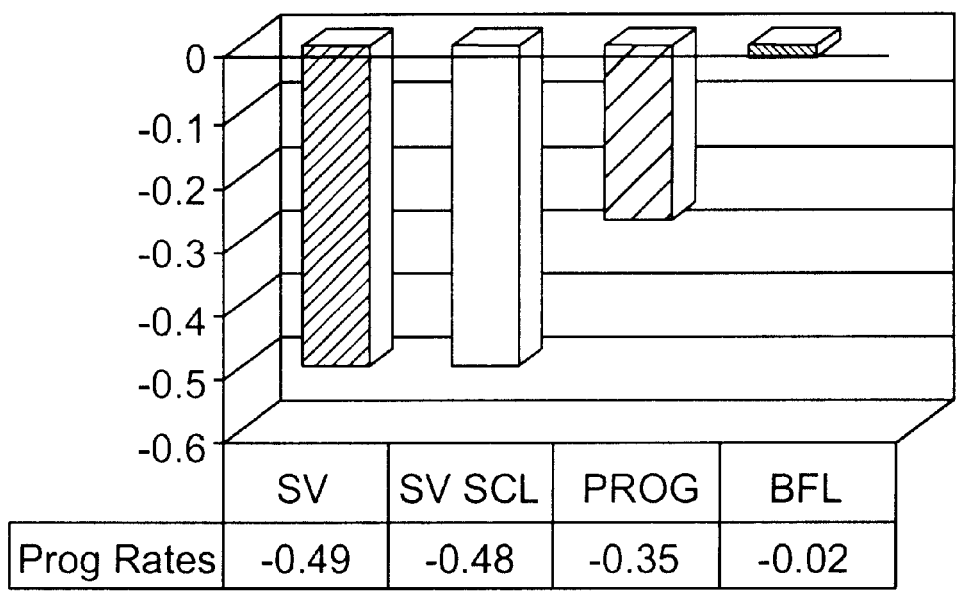
FIGS. 6A and 6B are graphical results of the study showing myopia progression rates along a 180° axis and 90° axis respectively.
Figure 6B:
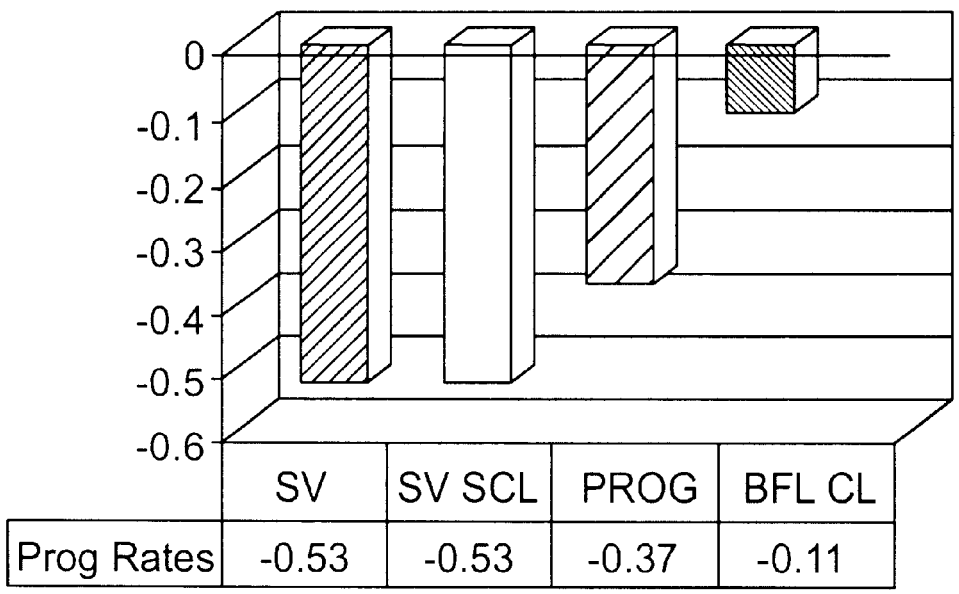

FIGS. 6A and 6B are graphical results of the study showing myopia progression rates along a 180° axis and 90° axis respectively. There are slightly greater increases in myopia along the 90 degree axis than along the 180 degree axis in all treatment groups, signifying a trend towards increasing with the rule astigmatism. These differences were found to be statistically significant only for the bifocal contact lens group.

FIGS. 7A–7D are results of the study showing myopia progression rates relative to age in table format. FIG. 7A shows that at every age studied, myopia progression was substantially reduced after bifocal contact lens wear. FIGS. 7B and 7C show that for each age range studied, there was a significantly lower progression rate for bifocal contact lenses compared to single vision soft contact and single vision spectacles. As this was a retrospective study of the myopia progression before and after bifocal contact lens wear, the bifocal contact was the last lens for each patient. Consequently, every patient was older when they wore bifocal contacts than when they were corrected by other means. It has been frequently reported that myopia usually ceases to progress at age 18, although there are reports documenting progression in adulthood. Because of this expected reduction in progression with age, it could be argued that if bifocal contacts are the last treatment for all patients, lower progression rates would be expected simply because the patients are older. Despite this prevailing opinion, there are data from studies that show progression in adulthood for late onset myopes. In particular, FIG. 7D indicates that there was no difference in myopia progression for soft contact lens wearers and single vision spectacle wearers below and above age twenty. For the bifocal contact wearers, there was significantly less progression above age 20 compared to below ago 20. This difference in rates based on age is consistent with the theory that late onset myopia is associated with near work. Thus, a treatment such as bifocal soft contact lenses that depends upon altering the stresses caused by intense near work should cause more progression reduction for adults than for children.

FIG. 8 are results of the study showing myopia progression rates relative to initial prescriptions in table format. The following table shows that the myopia progression reduction effect found with bifocal contact lenses, occurred regardless of the level of myopia. In addition, this population of patients demonstrated no discernable variation in progression rates with their other corrective lenses, relative to the degree of myopia present.

Conclusions

Bifocal soft contact lenses were effective in limiting the rate of myopic progression to clinically insignificant levels in this series of pre-presbyopic adults and children who exhibited near point esophoria or esophoria at near. The bifocals used in this study provide their add power in all fields of gaze, which may explain the superior results obtained as compared with progression studies with conventional bifocals or progressive spectacles. Additionally, since the associated phoria more directly measures the ability of the patient to compensate for their heterophoria, these progressive myopes may have been more accurately targeted as those most likely to be helped with bifocal treatment. Also, contact lens and add powers were individually chosen to maximally reduce the amount of near point associated esophoria, rather than use the same add for every patient. It is quite possible that these three unique approaches maximized whatever myopia retardation is possible with bifocal treatment of esophores.

Although certain preferred embodiments and methods have been disclosed herein, it will be apparent from the foregoing disclosure to those skilled in the art that variations and modifications of such embodiments and methods may be made without departing from the true spirit and scope of the invention. Therefore, the above description should not be taken as limiting the scope of the invention which is defined by the appended claims.

What is claimed is:

1. A method for controlling myopia progression, the method comprising:

identifying a myopic patient who exhibits near point esophoria, eso fixation disparity, or eso associated phoria;

measuring an amount of fixation disparity; and prescribing a bifocal contact lens add power prescription based on the fixation disparity measurement and a distance prescription for the patient's eye.

2. The method of claim 1, wherein the near point esophoric patient has the inability to control eye crossing.

3. The method of claim 1, wherein near point eso fixation disparity includes esophores, low exophores, and orthophores.

4. The method of claim 1, wherein the myopic patient exhibits at least −0.50 D myopia.

5. The method of claim 1, wherein the myopic patient exhibits myopia progression of at least −0.25 D per year.

6. The method of claim 1, further comprising identifying patients with anisometropia less than 2 D.

7. The method of claim 1, further comprising identifying patients with an astigmatism less than 1.5 D.

8. The method of claim 1, further comprising identifying patients who are pre-presbyopic.

9. The method of claim 1, wherein measuring fixation disparity comprises determining an amount of actual crossing of the patient's eyes.

10. The method of claim 1, wherein measuring fixation disparity comprises viewing a displaced polarized image through polarizing lenses, aligning the polarized image, and detecting a degree of vertical and/or horizontal misalignment of the patient's eyes based on a difference between the aligned image and true alignment.

11. The method of claim 1, wherein the bifocal contact lens power prescription provides distance visual acuity of at least 20/30.

12. The method of claim 1, wherein the bifocal contact lens power prescription reduces or inhibits esophoria at near.

13. The method of claim 12, wherein the bifocal contact lens power prescription reduces accommodation lag which in turn reduces myopia progression.

14. The method of claim 13, wherein the bifocal contact lens power prescription reduces hyperopic defocus which in turn reduces myopia progression.

15. The method of claim 1, further comprising correcting fixation disparity with bifocal add power adjustments until the patient sees straight so as to reduce myopia progression.

16. The method of claim 1, wherein the bifocal contact lens power prescription reduces myopia progression to less than −0.2 D per year.

17. The method of claim 1, wherein the bifocal contact lens power prescription reduces myopia progression to less than −0.08 D per year.

18. The method of claim 1, wherein the bifocal contact lens power prescription inhibits myopia progression.

19. The method of claim 1, wherein the bifocal contact lens power prescription reverses myopia progression.

20. The method of claim 1, wherein the bifocal contact lens power prescription significantly reduces myopia progression for late onset myopes.

21. The method of claim 1, wherein the bifocal contact lens power prescription is effective at all prescription levels.

22. The method of claim 1, wherein the bifocal contact lens power prescription comprises simultaneous vision or coaxial bifocal lenses.

23. The method of claim 1, wherein the bifocal contact lens power prescription comprises soft contact lenses.

24. The method of claim 1, wherein the bifocal contact lens power prescription comprises hard contact lenses.

25. The method of claim 1, wherein the bifocal contact lens power prescription comprises rigid gas permeable contact lenses.

26. The method of claim 1, wherein the bifocal contact lens power prescription provides lenses with high oxygen permeability.

27. A method for selectively prescribing bifocal contact lenses for controlling myopia progression, the method comprising:

identifying a near point esophoric myopic patient;

measuring an amount of fixation disparity;

prescribing a bifocal contact lens add power prescription based on the fixation disparity measurement and a distance prescription for the patient's eye; and correcting fixation disparity with bifocal add power adjustments until the patient sees straight so as to reduce myopia progression.

* * * * *